C. B. CHRYSLER.
CONTROLLER FOR MOTOR CHAIRS.
APPLICATION FILED DEC. 9, 1912.
1,098,939.
Patented June 2, 1914.
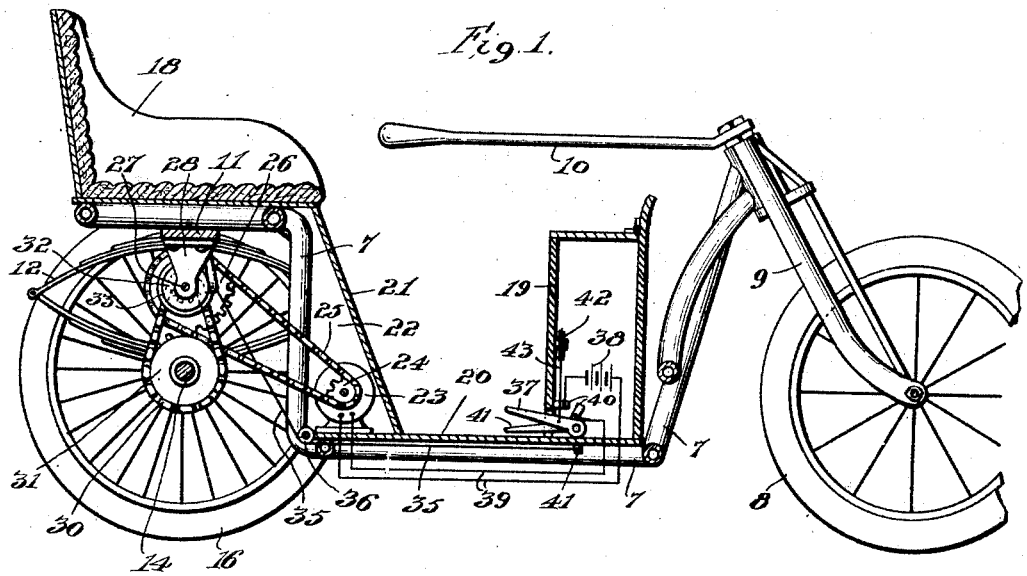
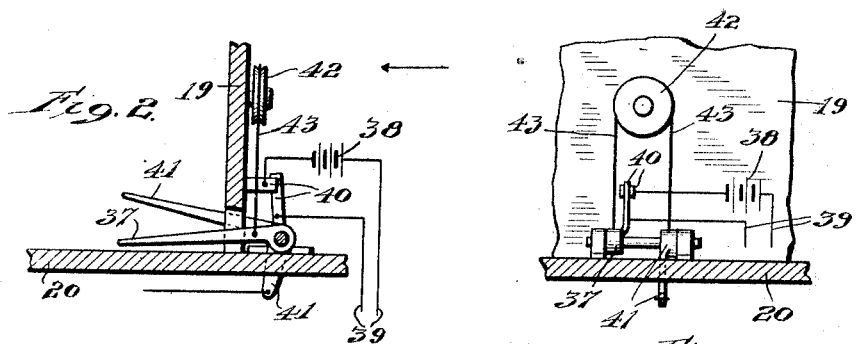
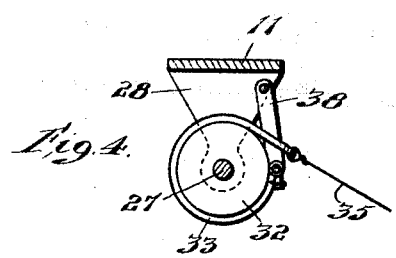
Witnesses.
H. J. Bull.
T. Colson.
Inventor,
Charles B. Chrysler,
By Joshua R. H. Potts
His Attorney.

UNITED STATES PATENT OFFICE.

CHARLES B. CHRYSLER, OF CHICAGO, ILLINOIS.

CONTROLLER FOR MOTOR-CHAIRS.

1,098,939.  Specification of Letters Patent.  Patented June 2, 1914.

Application filed December 9, 1912. Serial No. 735,748.

*To all whom it may concern:*

Be it known that I, CHARLES B. CHRYSLER, a citizen of the United States, and a resident of the city of Chicago, county of Cook, and State of Illinois, have invented certain new and useful Improvements in Controllers for Motor-Chairs, of which the following is a specification.

My invention relates to controllers for vehicles and particularly to a class of small motor-driven vehicles.

The object of this improvement is to provide controlling means for vehicles of the wheeled-chair type which is driven by an electric motor operated by a storage battery carried by the vehicle.

A further object is to provide a device of this character, which is simple in construction and efficient in its operation.

Other objects will appear hereinafter.

The invention consists in the combinations and arrangements of parts hereinafter described and claimed.

The invention will be best understood by reference to the accompanying drawings forming a part of this specification, and in which, Figure 1 is a vertical section of a vehicle having a controller embodying my invention, showing the electrical circuit in diagram, Fig. 2 is an enlarged fragmental section illustrating the simultaneous means for operating the brake and electric switch, Fig. 3 is a view of the same looking in the direction of the arrow in Fig. 2, and Fig. 4 is an enlarged fragmental section showing the brake and its mounting.

The preferred form of construction, as illustrated in the accompanying drawings, comprises a frame comprising tubes 7 joined together in a conventional manner such as brazing. The front wheel 8 is mounted on a suitable fork 9 and pivoted on the front portion of the frame in a conventional manner, a steering lever 10 is operatively connected with the fork 9 to effect steering of the vehicle in the conventional manner.

The rear portion of the frame is supported on a cross beam 11 and elliptical springs 12, one of which is shown. A rear axle 14 is journaled under said springs and rear wheels, one of which is shown, mounted on said axle, one wheel being rigidly secured to the axle and the other mounted to revolve independently of the axle. Since mounting wheels on an axle in this manner is well known no detail view thereof is shown.

A conventional seat 18 is carried by the frame 7 on its rear portion and a housing 19 is carried by said frame on its front portion. Between the seat 11 and housing 19 is a foot platform 20 and extending between the under side of the seat 18 and foot platform 20 is a housing 21 which is provided with end portions 22 and comprises a motor housing for the motor 23.

The motor 23 is secured in the bottom portion of the motor housing and connected by means of a sprocket wheel 24, sprocket chain 25 and sprocket wheel 26 to a jack-shaft 27 which is journaled in bearings 28 and the latter secured to the beam 11. A sprocket wheel 29 is connected, by means of a sprocket chain 30 with a sprocket wheel 31 on the axle 14, to operatively connect said motor 23 with the rear wheel 16 to effect traction of the vehicle. Secured near one end of the jack-shaft 27 is a brake-drum 32 having a conventional brake-band 33 connected by means of two links 34 to one of the bearings 28. Said brake-band is operated by means of a cord 35 which passes over a pulley 36 and connected with a manually operative lever 41 which is journaled in the lower portion of the housing 19.

The housing 19 is provided for the electric battery 38 which furnishes energy to operate the motor 23. The battery 38 is connected with the motor 23 by means of a conventional wire circuit 39 and in said circuit is a switch 40. The stationary portion of the switch 40 is secured to the inner side of the housing 19 and the moving member of the switch 40 is carried by a manually operative lever 37, which is journaled in the lower portion of the housing 19, as clearly illustrated. A pulley 42 is journaled on the inner side of the housing 19 and a cord 43 passed over said pulley with its two ends connected with the levers 37 and 41 in a manner to cause upward movement of one of said levers upon the downward movement of the other. In this manner it will be seen that upon moving the lever 37 downwardly to close the electric switch 40 the lever 41 will be moved upwardly thereby freeing the brake-band 33 on the brake-drum 32. Upon moving the lever 41 downwardly, the cord 43 causes upward movement of the lever 37 and opening of switch 40 thereby opening the electric circuit 39 connecting the battery 38 and motor 23.

In operation the operator moves the lever 37 downwardly to close the circuit 39 thereby permitting an electric current to pass from the battery 38 to the motor 23, whereupon the motor through the connecting gearing causes rotation of the rear wheel 16 which is secured to shaft 14 to propel the vehicle. When the operator desires to stop the vehicle he presses the lever 41 downwardly thereby opening the switch 40 to stop the passage of electricity through the circuit 39 to the motor 23 and sets the brake-band 33 of the brake-drum 32 to stop the vehicle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a mounting; a foot lever pivoted to said mounting; a brake mechanism operable by said foot lever; a second foot lever pivoted to said mounting; an electrical switch comprising a stationary member on said mounting and a movable member carried by said second mentioned lever and adapted to engage the stationary member to close the switch; a pulley on said mounting; and a cord over said pulley having its ends secured to said foot levers and adapted to cause operation of one foot lever upon operation of the other, substantially as described.

2. The combination of a foot lever; a brake mechanism operable by said foot lever; a second foot lever; an electric switch operable by said second foot lever; a pulley; and a cord over said pulley, having its ends secured to said foot levers and adapted to cause operation of one foot lever upon operation of the other, substantially as described.

In testimony whereof I have signed my name to this specification in the presence of two subscribing witnesses.

CHARLES B. CHRYSLER.

Witnesses:
JOSHUA R. H. POTTS,
HELEN F. LILLIS.

Copies of this patent may be obtained for five cents each, by addressing the "Commissioner of Patents, Washington, D. C."